United States Patent
Kong et al.

(10) Patent No.: US 11,592,875 B2
(45) Date of Patent: Feb. 28, 2023

(54) DOUBLE LOCK DESIGN FOR POLYPROPYLENE HOUSING

(71) Applicant: Continental Automotive GmbH, Hannover (DE)

(72) Inventors: Hian Keat Jeff Kong, Singapore (SG); Joo Hou Khor, Singapore (SG); Kevindran Pillay Mauree, Singapore (SG); Kok Hee Abel Lim, Singapore (SG)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 1144 days.

(21) Appl. No.: 16/300,685

(22) PCT Filed: Jun. 1, 2016

(86) PCT No.: PCT/IB2016/053211
§ 371 (c)(1),
(2) Date: Nov. 12, 2018

(87) PCT Pub. No.: WO2017/208054
PCT Pub. Date: Dec. 7, 2017

(65) Prior Publication Data
US 2019/0277072 A1    Sep. 12, 2019

(51) Int. Cl.
*E05C 19/06* (2006.01)
*G06F 1/16* (2006.01)
(Continued)

(52) U.S. Cl.
CPC ........ *G06F 1/1656* (2013.01); *E05B 15/1635* (2013.01); *E05B 2015/1642* (2013.01);
(Continued)

(58) Field of Classification Search
CPC ...... E05C 19/066; E05C 19/06; E05C 19/063; E05B 15/1635; E05B 2063/0026;
(Continued)

(56) References Cited

U.S. PATENT DOCUMENTS 396,429 A * 1/1889 Pratt .................... E05C 19/063
                                                        292/17
2,761,722 A * 9/1956 Wilfert ................ E05B 15/0006
                                                        292/DIG. 55
(Continued)

FOREIGN PATENT DOCUMENTS

CA    2269344 A1    10/2000
EP    0791987 A2    8/1997
(Continued)

OTHER PUBLICATIONS

Extended European Search Report for European Application No. 16 903 901.3, dated Jan. 15, 2020, 7 pages.
(Continued)

*Primary Examiner* — Kristina R Fulton
*Assistant Examiner* — Tal Saif
(74) *Attorney, Agent, or Firm* — RatnerPrestia

(57) ABSTRACT

A plastic arrangement that includes a first plastic component, a second plastic component, and a plastic lock mechanism for fastening the second plastic component to the first plastic component. The plastic lock mechanism includes a first lock unit and a second lock unit. The first lock unit includes a U-shaped cantilever member, a catch element and a catch element retention part. The second lock unit includes a protruding member and a protruding member retention part. The plastic lock mechanism provides a locked position wherein the catch element retention part restricts movement of the catch element for preventing the second plastic component from separating from the first plastic component,
(Continued)

and the protruding member retention part restricts movement of the protruding member for hindering the moving of the first lock unit to a released position.

13 Claims, 3 Drawing Sheets

(51) Int. Cl.
  *E05B 15/16* (2006.01)
  *E05B 63/00* (2006.01)
(52) U.S. Cl.
  CPC ..... *E05B 2063/0026* (2013.01); *E05C 19/063* (2013.01); *E05C 19/066* (2013.01); *Y10S 292/38* (2013.01)
(58) Field of Classification Search
  CPC ........... E05B 2015/1642; G06F 1/1656; Y10T 292/08; Y10T 292/082; Y10T 292/0817; Y10T 292/088; Y10T 292/0894; Y10T 292/0902; Y10T 292/0905; Y10T 292/0907; Y10T 292/42; Y10T 292/438; Y10T 292/444; Y10S 292/11; Y10S 292/38; Y10S 292/48; Y10S 292/50; Y10S 292/63
  See application file for complete search history.

(56) References Cited

U.S. PATENT DOCUMENTS

| | | | | |
|---|---|---|---|---|
| 3,819,294 | A * | 6/1974 | Honnold | F04D 25/082 416/241 A |
| 4,759,455 | A * | 7/1988 | Wilson | B65D 47/0838 215/206 |
| 5,137,260 | A * | 8/1992 | Pehr | E05D 9/005 220/326 |
| 5,810,188 | A | 9/1998 | Novakoski et al. | |
| 6,276,581 | B1 | 8/2001 | Glock | |
| 6,761,279 | B1 * | 7/2004 | Martin | B65D 43/169 220/259.2 |
| 6,948,982 | B2 | 9/2005 | Higuchi et al. | |
| 7,798,348 | B2 * | 9/2010 | Sawyer | B65D 47/0809 220/283 |
| 2002/0114660 | A1 | 8/2002 | Burton | |
| 2005/0255737 | A1 | 11/2005 | Bella et al. | |
| 2009/0260996 | A1 | 10/2009 | Ikeda et al. | |
| 2015/0210444 | A1 * | 7/2015 | Mercado | B65D 43/22 220/322 |
| 2019/0277072 | A1 | 9/2019 | Kong et al. | |

FOREIGN PATENT DOCUMENTS

| | | | | |
|---|---|---|---|---|
| JP | 52132728 | U | | 10/1977 |
| JP | S52132728 | U | * | 10/1977 |
| JP | 5484058 | U | | 6/1979 |
| JP | 6027049 | U | | 2/1985 |
| JP | 62128685 | U | | 8/1987 |
| JP | 09136970 | A | | 5/1997 |
| JP | H09136970 | A | * | 5/1997 |
| JP | 09210019 | A | | 8/1997 |
| JP | 2004047762 | A | | 2/2004 |
| JP | 2004048862 | A | | 2/2004 |
| JP | 2006104882 | A | * | 4/2006 ............... E05B 9/08 |
| JP | 6794471 | B2 | | 12/2020 |

OTHER PUBLICATIONS

Chinese Office Action for Chinese Application No. 201680086255.1, dated Mar. 10, 2020, with translation, 11 pages.
Notice of Reasons for Refusal for Japanese Application No. 2018-563142, dated Mar. 4, 2020, with translation, 12 pages.
Chinese Office Action for Chinese Application No. 201680086255.1, dated Nov. 25, 2020, with English language summary, 8 pages.
Japanese Decision to Grant a Patent for Japanese Application No. 2018-563142, dated Oct. 14, 2020 with translation, 5 pages.
International Preliminary Report on Patentability for Application No. PCT/IB2016/053211, dated Sep. 5, 2018, 7 pages.
International Search Report and Written Opinion for International Application No. PCT/IB2016/053211, dated Feb. 23, 2017, 12 pages.
Chinese Office Action for Chinese Application No. 201680086255.1, dated May 17, 2021 with translation, 13 pages.
Extended European Search Report for European Application No. 16903901.3, dated Jan. 15, 2020, 6 pages.

* cited by examiner

US 11,592,875 B2

DOUBLE LOCK DESIGN FOR POLYPROPYLENE HOUSING

CROSS REFERENCE TO RELATED APPLICATION

This application is the U.S. National Phase Application of PCT International Application No. PCT/IB2016/053211, filed Jun. 1, 2016, the contents of such application being incorporated by reference herein.

FIELD OF THE INVENTION

The present application relates to an improved lock for a plastic housing. The plastic housing includes polypropylene (PP), which is filled with talc.

BACKGROUND OF THE INVENTION

Many snap-fit catch mechanisms are currently available for plastic products with high ductility. These plastic products with high ductility can be made from polycarbonate (PC) material, acrylonitrile butadiene styrene (ABS) material, or polypropylene (PP) material. Polypropylene can be filled with talc for lowering its cost. Comparing to unfilled polypropylene, polypropylene, which is filled with talc, is stiffer and has lower yield strength, after which permanent deformation will set in with increasing elongation or strain.

SUMMARY OF THE INVENTION

An aspect of this application aims to provide an improved locking mechanism for a talc filled polypropylene (PP) plastic housing.

The application provides a plastic arrangement for a plastic housing. The plastic housing can be used for storing, for an example, an electronic component. The plastic arrangement includes a first plastic component (e.g., a "plastic first housing portion"), a second plastic component (e.g., a "plastic second housing portion"), and a plastic lock mechanism (e.g., a "plastic push-to-lock locking mechanism") for fastening or locking a part of the second plastic component to a part of the first plastic component.

In one implementation, the first plastic component refers to a plastic casing while the second plastic component refers to a service door. The plastic lock mechanism serves a push to lock mechanism for fastening the service door to the plastic casing. The push-to-lock locking mechanism is different from a snap fit mechanism.

The snap fit mechanism includes a protruding part of one component, such as a hook, being deflected or bended briefly during a joining operation. The protruding part then catches in a depression or undercut in of a mating component.

The push to lock mechanism requires a user pushing a protruding part to catch or hook with a depression or undercut of a mating component.

The plastic lock mechanism includes a first lock unit and a second lock unit.

The first lock unit includes an U-shaped cantilever member, a catch element, and a catch element retention part.

The U-shaped cantilever member, which serves as a deflection device, is integrally connected to an end part of the second plastic component.

The catch element is integrally connected to the U-shaped cantilever member while the catch element retention part is integrally connected to the first plastic component. Both the catch element and the catch element retention part serve as a first retention mechanism, wherein, in a locked state, the catch element retention part blocks or restricts a movement of the catch element.

The second lock unit includes a protruding member and a protruding member retention part. The protruding member is integrally connected to the U-shaped cantilever member while the protruding member retention part is integrally connected to an end part of the first plastic component. The protruding member and the protruding member retention part act as a second retention mechanism, wherein, in a locked state, the protruding member retention part holds and grips the protruding member for restricting a movement of the protruding member.

The plastic lock mechanism provides a released position and a locked position.

In the released position, the catch element is positioned in an unfastened position. In this unfastened position, the catch element is positioned such that the catch element retention part does not block the catch element. Furthermore, the protruding member is also positioned such that the protruding member retention part does not hold the protruding member. The positioning of these parts allows the second plastic component to be unfastened from the first plastic component. In another words, the second plastic component can be moved away from the first plastic component.

In the locked position, the catch element is positioned in a fastened position, wherein the catch element retention part is positioned adjacent to the catch element such that the catch element retention part blocks or restricts the movement of the catch element for fastening the second plastic component to the first plastic component. At the same time, the protruding member retention part receives and holds the protruding member for keeping the catch element in the fastened position. The catch element cannot move to the unfastened position unless the protruding member retention part is positioned away from the protruding member and it does not hold the protruding member.

The plastic lock mechanism is adapted such that a first end portion of the U-shaped cantilever member is pushed away from a second end portion of the U-shaped cantilever member for placing the plastic lock mechanism in the locked position from the released position.

In detail, a user can position the second plastic component adjacent to the first plastic component such that an outer surface of the second plastic component is flushed with an outer surface of the first plastic component. The user then can push the first end portion of the U-shaped cantilever member away from the second end portion of the U-shaped cantilever member such that the U-shaped cantilever member is flexed or bend in a manner to position the catch element adjacent to the catch element retention part, which blocks the movement of the catch element. The flexed U-shaped cantilever member also positions the protruding member for the protruding member retention part to receive and to hold the protruding member. The positioning of these parts places the plastic lock mechanism in the locked position.

The first plastic component, the second plastic component, and the plastic lock mechanism comprise polypropylene material that is filled with talc, which has low cost and is stiff. In other words, all these parts can be produced from the same material, thereby allowing production of these parts by a single step of plastic injection moulding.

The plastic lock mechanism advantageously provides two lock units in order to provide a more stable and secured locked position for fastening the second plastic component to the first plastic component. Such a plastic locking mechanism can also meet automotive testing requirements, such as a vibration test and a mechanical shock test.

Moreover, the plastic lock mechanism can be highly durable. The plastic lock mechanism can be locked and unlocked many times without any breakage.

Furthermore, the plastic arrangement can be provided in a single part, which is moulded in one operating step, thereby providing a short processing time and low cost. In addition, the use of the low cost talc filled polypropylene leads to further reduced cost.

The application also provides a further plastic arrangement. The plastic arrangement includes a first plastic component, a second plastic component, and a plastic lock mechanism for fastening the second plastic component to the first plastic component.

The plastic lock mechanism includes a first lock unit and a second lock unit.

The first lock unit includes an U-shaped cantilever member, a catch element, and a catch element retention part. The U-shaped cantilever member is integrally connected to the second plastic component. The catch element is integrally connected to the U-shaped cantilever member, and the catch element retention part is integrally connected to the first plastic component.

The second lock unit includes a protruding member and a protruding member retention part. The protruding member is integrally connected to the U-shaped cantilever member while the protruding member retention part is integrally connected to the first plastic component.

The plastic lock mechanism provides a released position and a locked position.

In the released position, the catch element is positioned in an unfastened position. In this unfastened position, the catch element is positioned such that the catch element retention part does not block the catch element, and the protruding member is positioned such that the protruding member retention part does not hold the protruding member for unfastening the second plastic component from the first plastic component.

In the locked position, the catch element is positioned in a fastened position. In this fastened position, the catch element retention part blocks or restricts the movement of the catch element for fastening the second plastic component to the first plastic component, and the protruding member retention part holds the protruding member for keeping the catch element in the fastened position.

The first plastic component, the second plastic component, and the plastic lock mechanism can comprise polypropylene material that is filled with talc.

The plastic lock mechanism can be adapted such that a first end portion of the U-shaped cantilever member is pushed away from a second end portion of the U-shaped cantilever member for placing the plastic lock mechanism in the locked position from the released position.

Conversely, the plastic lock mechanism can be adapted such that the first end portion of the U-shaped cantilever member is pushed towards to the second end portion of the U-shaped cantilever member for placing the plastic lock mechanism in the released position from the locked position.

In the locked position, the catch element retention part can block a plastic component unfastening movement of the catch element in a first direction. The first direction refers to a direction in a plane, which is perpendicular to an outer surface of the first plastic component. The movement of the catch element in the first direction acts to unfasten the second plastic component from the first plastic component.

In the locked position, the protruding member retainer part can restrict a protruding member unfastening movement of the protruding member in a second direction. The movement of the protruding member in the second direction acts to place the catch element in the unfastened position.

The second direction can be perpendicular to the first direction.

The restriction of the movements of the catch element and the protruding member in two different orthogonal directions mentioned above allows an effective implementation of a more secured and stable locking mechanism.

The protruding member can be positioned between the catch element and the first end portion of the U-shaped cantilever member for easy implementation.

The protruding member can include a disc element while the protruding member retention part can include a pair of retention arms. The retention arms and the disc element then provide a socket and ball connection mechanism, which can provide a more secured and stable connection.

In one aspect of the application, the plastic arrangement includes a deflection limiter part for restricting the movement of the U-shaped cantilever member, wherein the deflection limiter part can be integrally connected to the second plastic component. The restriction of the movement acts to reduce stress on the U-shaped cantilever member for higher durability of the U-shaped cantilever member.

The plastic arrangement can also include a plastic living hinge for connecting the first plastic component to the second plastic component. The plastic living hinge allows for use of injection moulding.

The first plastic component, the second plastic component, and the plastic lock mechanism can be produced by a single step of plastic injection moulding, which has a short processing time and has low production cost.

The application also provides a plastic housing for storing an electronic component. The plastic housing includes the above plastic arrangement, which includes a first plastic component, a second plastic component, and a plastic lock mechanism. The plastic lock mechanism is used for fastening the second plastic component to the first plastic component while the second plastic component serves as a service door.

DETAILED DESCRIPTION OF THE PREFERRED EMBODIMENTS

In the following description, details are provided to describe embodiments of the application. It shall be apparent to one skilled in the art, however, that the embodiments may be practiced without such details.

Some parts of the embodiment have similar parts. The similar parts may have the same names or similar part numbers. The description of one similar part also applies by reference to another similar parts, where appropriate, thereby reducing repetition of text without limiting the disclosure.

Figure 1:
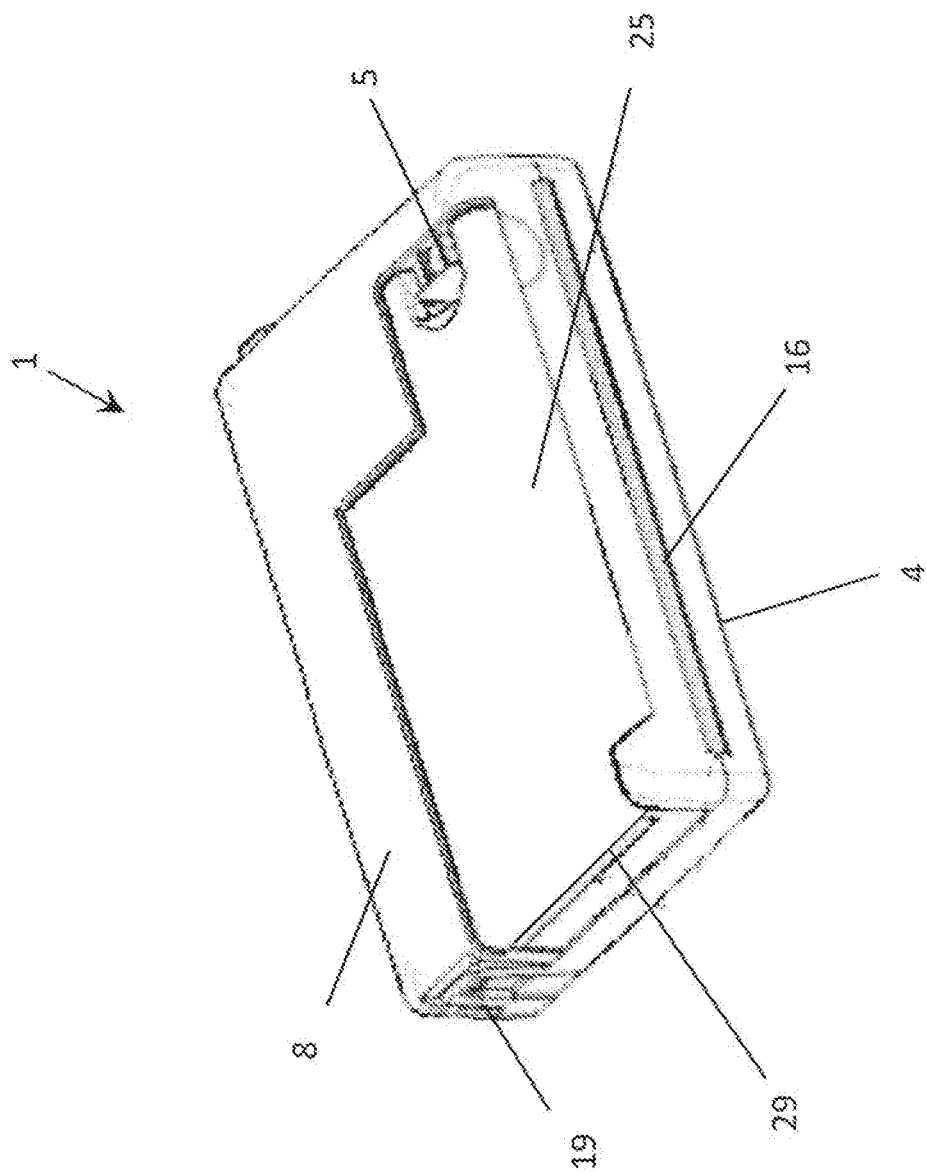
FIG. 1 illustrates a front perspective view of an improved plastic housing unit, the plastic housing unit includes a plastic housing portion with a door and with a locking mechanism, wherein the locking mechanism is placed in a locked position.

FIG. 1 shows a plastic housing 1 for an electronic device. The plastic housing 1 is produced from talc filled polypropylene using an injection moulding process.

The plastic housing 1 comprises a plastic first housing portion 4, a plastic second housing portion 8, and a plastic housing portion living hinge 16.

Each of the first housing portion 4 and the second housing portion 8 has a shape of an open rectangular box with a rim. The housing portion living hinge 16 integrally joins the rim of the first housing portion 4 with the rim of the second housing portion 8.

The plastic housing 1 also includes several plastic housing locking units 19. Each housing locking unit 19 includes a plastic first housing locking element and a corresponding plastic second housing locking element. The first housing locking element is located at the rim of the first housing portion 4 while the second housing locking element is located at the rim of the second housing portion 8. The second housing locking element is adapted for locking with the corresponding first housing locking element.

Referring to the second housing portion 8, it includes a plastic service door or cover 25 with a plastic push-to-lock locking mechanism 5 and a plastic door living hinge 29. The living hinge 29 integrally joins the service door 25 to a part of the second housing portion 8. The plastic service door 25 is rotatable about a longitudinal axis of the plastic door living hinge 29.

Figure 2:
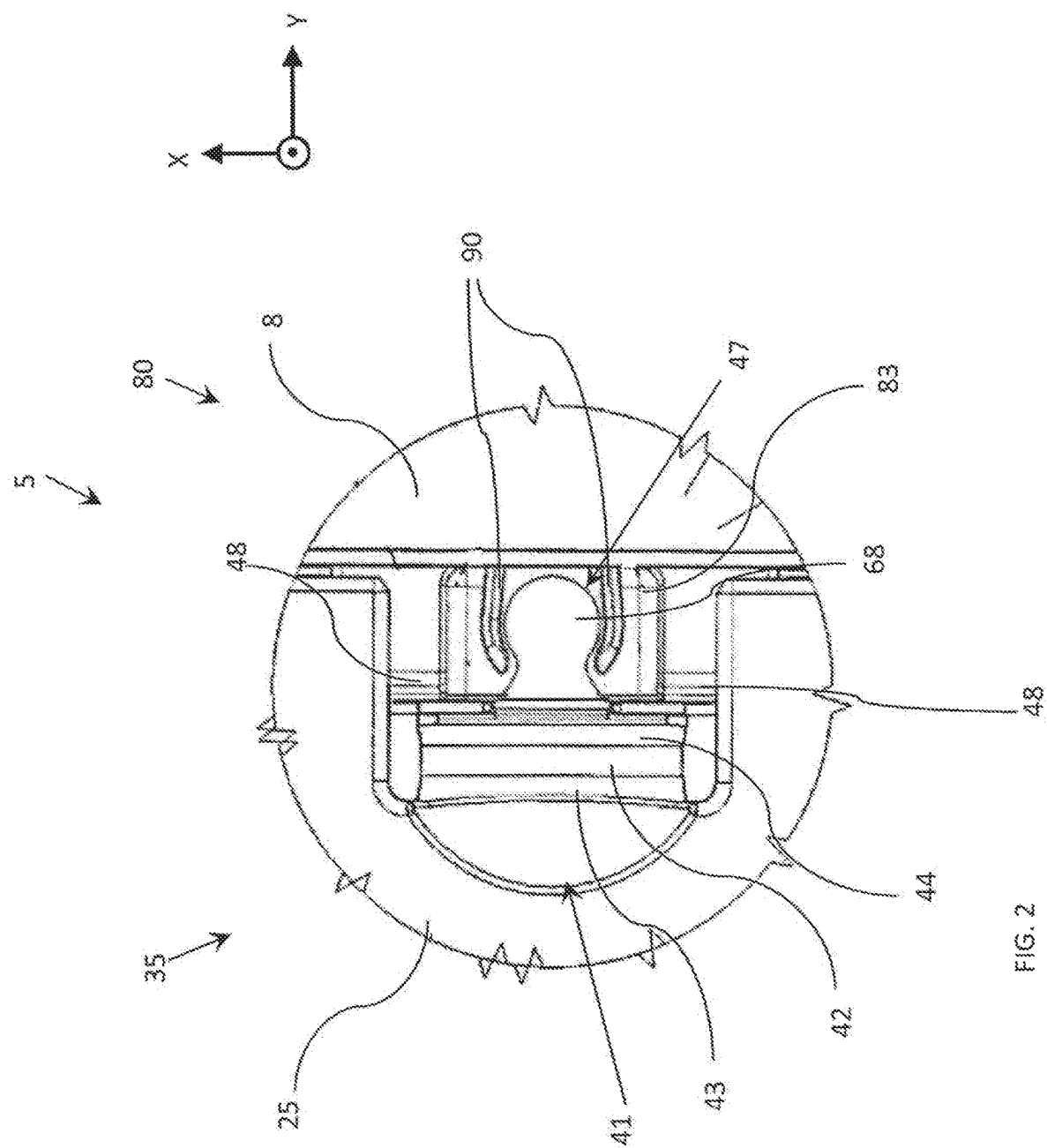
FIG. 2 illustrates a plan view of the locking mechanism of FIG. 1.
Figure 3:
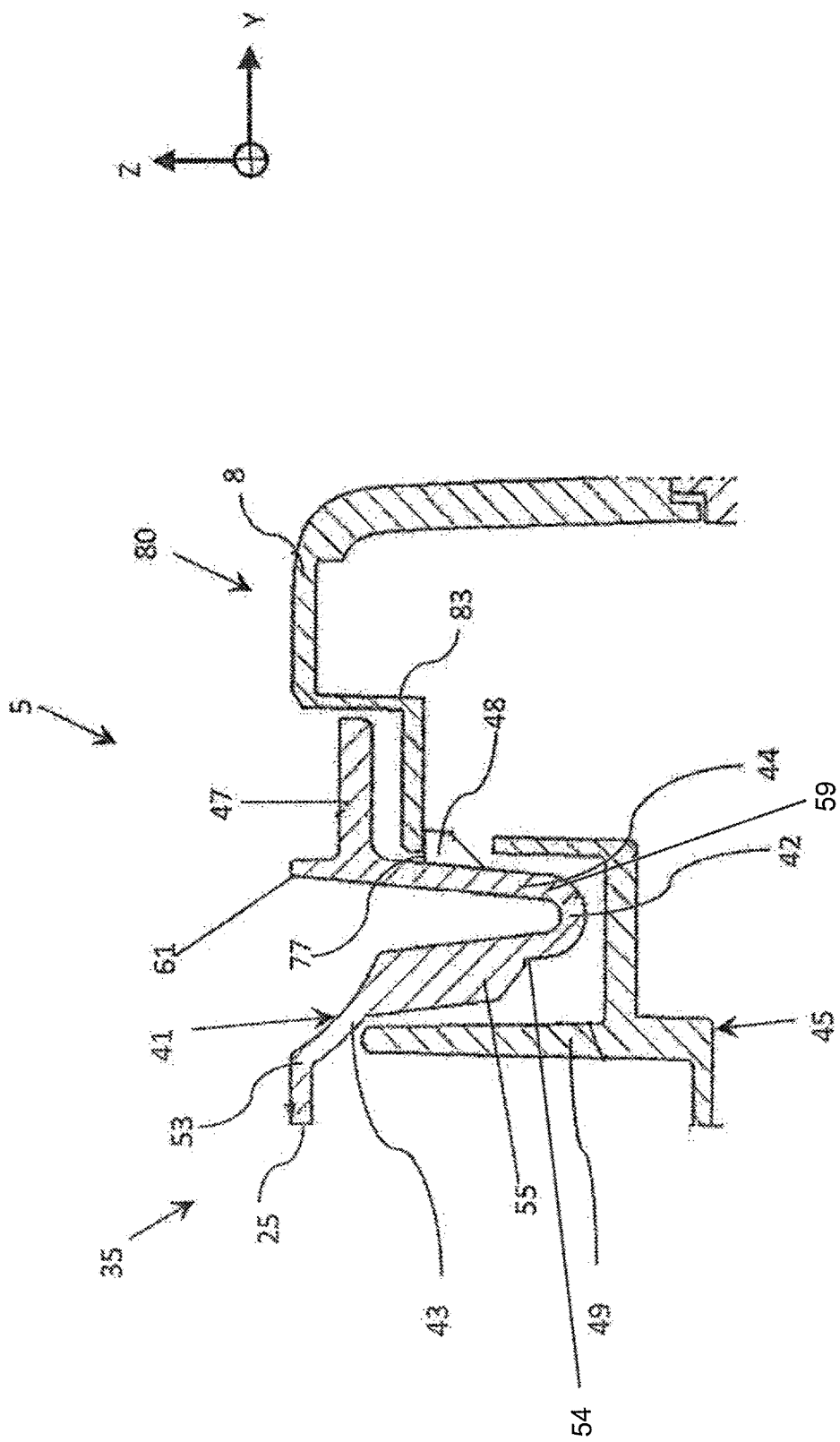
FIG. 3 illustrates a cross sectional view of the locking mechanism of FIG. 2.

As better seen in FIGS. 2 and 3, the locking mechanism 5 includes a first lock unit 35, a second lock unit 80, and a lock unit movement limiter part 45. The first lock unit 35 is placed near the lock unit movement limiter part 45.

The first lock unit 35 comprises an U-shaped cantilever 41 with a catch element 48 and a catch element retention unit 83. The U-shaped cantilever 41 is integrally connected to an edge part of the plastic service door 25 while the catch element 48 is integrally connected to the U-shaped cantilever 41. The catch element retention unit 83 is integrally connected to an edge part of the second housing portion 8.

The U-shaped cantilever 41 includes a substantially U-shaped connection member 42, an elongated first arm member 43 and an elongated second arm member 44.

A first end 53 of the first arm member 43 is integrally connected to the plastic service door 25 while a second end 54 of the first arm member 43 is integrally connected to an end of the U-shaped connection member 42. Another end of the U-shaped connection member 42 is integrally connected to a first end 59 of the second arm member 44. The first arm member 43 and the second arm member 44 are arranged such that they face each other. The second arm member 44 can rotate by a few degrees about the U-shaped connection member 42 with respect to the first arm member 43.

The first arm member 43 includes an enlarged stopper portion 55. The enlarged stopper portion 55 has a cross sectional area, which is larger than a cross sectional area of other portions of the first cantilever arm member 43.

The catch element 48 includes an elongated beam having a substantially right-angled trapezoid cross section and a flat retention surface 77. The elongated beam is integrally connected to an outer part of the second arm member 44.

The catch element retention unit 83 is integrally connected to the edge part of the second housing portion 8. In a locked position, the catch element retention unit 83 is adapted to block the catch element 48 such that the door 25 is closed and that the door 25 is locked to the second housing portion 8.

The second lock unit 80 comprises a disc protrusion 47 and a pair of disc retention or holding arms 90. The disc protrusion 47 is integrally connected to the second arm member 44 such that the disc protrusion 47 is located between the catch element 48 and a second end 61 of the second arm member 44. The disc holding arms 90 are integrally connected to the catch element retention unit 83.

The disc protrusion 47 includes a disc portion 68. Each of the disc holding arms 90 includes a curved portion, which is adapted, in the locked position, to hold the disc portion 68 of the disc latch protrusion 47.

Referring to the lock unit movement limiter part 45, it includes a blocking portion 49, which is placed near an outer surface of the enlarged stopper portion 55.

In use, the plastic housing 1 is intended for storing an object, such as an electronic device. The service door 25 allows the object to be placed inside the plastic housing 1.

With reference to the lock unit movement limiter part 45, the blocking portion 49 acts to block or restrict the movement of the stopper portion 55.

The push-to-lock locking mechanism 5 can be placed in a locked position and a released position.

In the locked position, with reference to the first lock unit 35, the retention surface 77 of the catch element 48 is placed adjacent to an outer surface the catch element retention unit 83 such that the catch element retention unit 83 restricts or blocks movement of the catch element 48 in a direction of a z-axis, as shown in FIG. 3, to prevent the service door 25 from opening. The z-axis extends in a direction of the opening of the door 25.

With reference to the second lock unit 80, the disc portion 68 of the disc protrusion 47 is placed between the two disc holding arms 90, wherein the disc holding arms 90 serve to retain the disc portion 68 for restricting the movement of the disc portion 68 along a y-axis, as shown in FIGS. 2 and 3. The y-axis extends in a direction that is perpendicular to a plane of an x-axis and the z-axis. The x-axis extends in a direction of the longitudinal axis of the living hinge 29, as shown in FIG. 1. The restriction of movement of the disc portion 68 hinders or defers the first lock unit 35 from moving away from the locked position.

Put differently, the disc holding arms 90 surrounds the disc portion 68 and keeps the disc portion 68 in position for preventing the catch element 48 from moving away from the catch element retention unit 83 such that the movement of the catch element 48 is not restricted by the catch element retention unit 83.

In the released position, with reference to the second lock unit 80, the disc portion 68 is positioned away from the disc holding arms 90 for allowing the catch element 48 to move away from the catch element retention unit 83.

With reference to the first lock unit 35, the catch element 48 is positioned away from the catch element retention unit 83 such that the catch element retention unit 83 does not block or restrict the movement of the catch element 48 in the direction of the z-axis. In other words, the first lock unit 35 allows the service door 25 to open.

In short, the second lock unit 80 allows the first lock unit 35 to move away from the locked position to the released position.

To place the locking mechanism 5 in the locked position from the released position, a user places the service door 25 in a closed position, wherein the service door 25 is rotated about the plastic door living hinge 29 until the outer surface of the service door 25 is flushed with the outer surface of the second housing portion 8.

The user then pushes the second end 61 of the second arm member 44 away from the first end 53 of the first arm member 43 to place the locking mechanism 5 in the locked position, as described above, for fastening the service door 25 to the second housing portion 8.

To place the locking mechanism 5 from the locked position to the released position, the user pushes the second end 61 of the second arm member 44 towards the first end 53 of the first arm member 43, such that the service door 25 is not fastened to the second housing portion 8.

The service door 25 is then placed in an open position, wherein the service door 25 is rotated about the plastic door living hinge 29 until the outer surface of the service door 25 is not flushed with the outer surface of the second housing portion 8.

In short, the plastic U-shaped cantilever 41 acts as a deflection mechanism. The catch element 48 and the catch element retention unit 83 serve as a first retention mechanism. The disc portion 68 and the two disc holding arms 90 act as a second retention mechanism.

In a general sense, the first arm member 43 and the blocking portion 49 of the lock unit movement limiter part 45 can be provided in different configurations for restricting the movement of the first arm member 43.

A ball and a socket retention mechanism can replace the disc protrusion 47 and the disc holding arms 90 of the second lock unit 80.

The improved locking mechanism 5 provides several benefits.

The first lock unit 35, the second lock unit 80, and the blocking portion 49 of the lock unit movement limiter part 45, in the locked position, restrict movements of parts of the locking mechanism 5 in different orthogonal directions. This then allows the locking mechanism 5 to have a stable and secured locked position.

This restriction of movement prevents the parts of the locking mechanism 5 from reaching the elongation break point, thereby preventing the parts of the locking mechanism 5 from breaking.

Such a locking mechanism 5 can meet automotive testing requirements, such as a vibration test and a mechanical shock test.

The locking mechanism 5 is also suitable for plastic products that is stiff and has low elongation break point because the two lock units of the locking mechanism 5 need only to flex or bend a bit when moving between the locked position and the release position.

These features also allow the locking mechanism 5 to be locked and unlocked many times without any breakage. In other words, this locking mechanism 5 is highly durable. Polypropylene material that is filled with talc, has a low material cost and can be used to produce the plastic housing 1.

The locking mechanism 5 is also easy to operate without use of any additional tool.

Furthermore, the plastic housing 1 with the locking mechanism 5 can be provided in a single part, which is moulded in one operating step, thereby providing a short processing time and low cost.

The locking mechanism 5 is different from other plastic locks, which can achieve only some, and not all, of the above-mentioned benefits.

The embodiments can also be described with the following lists of features or elements being organized into an item list. The respective combinations of features, which are disclosed in the item list, are regarded as independent subject matter, respectively, that can also be combined with other features of the application.

1. A plastic arrangement comprising
   a first plastic component,
   a second plastic component, and
   a plastic lock mechanism for fastening the second plastic component to the first plastic component,
   the plastic lock mechanism comprising
     a first lock unit comprising
       an U-shaped cantilever member being integrally connected to the second plastic component,
       a catch element being integrally connected to the U-shaped cantilever member, and
       a catch element retention part being integrally connected to the first plastic component, and
     a second lock unit comprising
       a protruding member being integrally connected to the U-shaped cantilever member, and
       a protruding member retention part being integrally connected to the first plastic component,
   wherein
   the plastic lock mechanism provides a released position and a locked position,
   wherein
     in the released position, the catch element is positioned in an unfastened position, wherein the catch element is positioned such that the catch element retention part does not block the catch element and the protruding member is positioned such that the protruding member retention part does not hold the protruding member for unfastening the second plastic component from the first plastic component,
     in the locked position, the catch element is positioned in a fastened position, wherein the catch element retention part blocks the catch element for fastening the second plastic component to the first plastic component, and
   the protruding member retention part holds the protruding member for keeping the catch element in the fastened position,
   wherein
   the plastic lock mechanism is adapted such that a first end portion of the U-shaped cantilever member is pushed away from a second end portion of the U-shaped cantilever member for placing the plastic lock mechanism in the locked position, and
   wherein
   the first plastic component, the second plastic component, and the plastic lock mechanism comprise polypropylene material that is filled with talc.

2. A plastic arrangement comprising
   a first plastic component,
   a second plastic component, and
   a plastic lock mechanism for fastening the second plastic component to the first plastic component,
   the plastic lock mechanism comprising
     a first lock unit comprising
       an U-shaped cantilever member being integrally connected to the second plastic component,
       a catch element being integrally connected to the U-shaped cantilever member, and
       a catch element retention part being integrally connected to the first plastic component, and
     a second lock unit comprising
       a protruding member being integrally connected to the U-shaped cantilever member, and a protruding member retention part being integrally connected to the first plastic component,
wherein the plastic lock mechanism provides a released position and a locked position,
wherein
in the released position, the catch element is positioned in an unfastened position, wherein the catch element is positioned such that the catch element retention part does not block the catch element and the protruding member is positioned such that the protruding member retention part does not hold the protruding member for unfastening the second plastic component from the first plastic component,
in the locked position, the catch element is positioned in a fastened position, wherein the catch element retention part blocks the catch element for fastening the second plastic component to the first plastic component,
and the protruding member retention part holds the protruding member for keeping the catch element in the fastened position.

3. The plastic arrangement according to item 2, wherein the first plastic component, the second plastic component, and the plastic lock mechanism comprise polypropylene material that is filled with talc.

4. The plastic arrangement according to item 2 or 3, wherein
the plastic lock mechanism is adapted such that a first end portion of the U-shaped cantilever member is pushed away from a second end portion of the U-shaped cantilever member for placing the plastic lock mechanism in the locked position.

5. The plastic arrangement according to one of the above-mentioned items, wherein the plastic lock mechanism is adapted such that a first end portion of the U-shaped cantilever member is pushed towards to a second end portion of the U-shaped cantilever member for placing the plastic lock mechanism in the released position.

6. The plastic arrangement according to one of the above-mentioned items, wherein in the locked position, the catch element retention part blocks a plastic component unfastening movement of the catch element in a first direction, and the protruding member retainer part restricts a protruding member unfastening movement of the protruding member in a second direction.

7. The plastic arrangement according to item 6, wherein the second direction is perpendicular to the first direction.

8. The plastic arrangement according to one of the above-mentioned items, wherein the protruding member is positioned between the catch element and the first end portion of the U-shaped cantilever member.

9. The plastic arrangement according to one of the above-mentioned items, wherein the protruding member comprises a disc element.

10. The plastic arrangement according to item 9, wherein the protruding member retention part comprises a pair of retention arms, the retention arms and the disc element provide a socket and ball connection mechanism.

11. The plastic arrangement according to one of the above-mentioned items further comprising
a deflection limiter part for restricting the movement of the U-shaped cantilever member.

12. The plastic arrangement according to one of the above-mentioned items further comprising
a plastic living hinge for connecting the first plastic component to the second plastic component.

13. The plastic arrangement according to one of the above-mentioned items, wherein the first plastic component, the second plastic component, and the plastic lock mechanism are produced by plastic injection moulding.

14. A plastic housing for storing an electronic component, the plastic housing comprising
a plastic arrangement according to one of items 1 to 12 comprising
a first plastic component,
a second plastic component, and
a plastic lock mechanism for fastening the second plastic component to the first plastic component.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

REFERENCE NUMBERS 1 plastic housing
4 first housing portion
5 locking mechanism
8 second housing portion
16 housing portion living hinge
19 housing locking unit
25 service door
29 door living hinge
35 first lock unit
41 U-shaped cantilever
42 U-shaped connection member
43 first arm member
44 second arm member
45 lock unit movement limiter part
47 disc protrusion
48 catch element
49 blocking portion
53 first end
54 second end
55 stopper portion
59 first end
61 second end
68 disc portion
77 retention surface
80 second lock unit
83 catch element retention unit
90 disc holding arms

The invention claimed is:

1. A plastic arrangement comprising:
a first plastic component,
a second plastic component, and
a plastic lock mechanism for fastening the second plastic component to the first plastic component,
the plastic lock mechanism comprising:
a first lock unit comprising:
a U-shaped cantilever member being integrally connected to the second plastic component,
a catch element being integrally connected to the U-shaped cantilever member, and
a catch element retention part being integrally connected to the first plastic component, and a second lock unit comprising:
a protruding member being integrally connected to the U-shaped cantilever member, the protruding member comprising a disc element, and
a protruding member retention part being integrally connected to the first plastic component,
wherein
the plastic lock mechanism provides a released position and a locked position, wherein
in the released position, the catch element is positioned in an unfastened position, wherein the catch element is positioned such that the catch element retention part does not block the catch element and the protruding member is positioned such that the protruding member retention part does not hold the protruding member for unfastening the second plastic component from the first plastic component,
in the locked position, the catch element is positioned in a fastened position, wherein the catch element retention part blocks the catch element for fastening the second plastic component to the first plastic component,
and the protruding member retention part holds the protruding member for keeping the catch element in the fastened position.

2. The plastic arrangement according to claim 1, wherein the first plastic component, the second plastic component, and the plastic lock mechanism comprise polypropylene material that is filled with talc.

3. The plastic arrangement according to claim 1, wherein the plastic lock mechanism is adapted such that a first end portion of the U-shaped cantilever member is pushed away from a second end portion of the U-shaped cantilever member for placing the plastic lock mechanism in the locked position.

4. The plastic arrangement according to claim 1, wherein the plastic lock mechanism is adapted such that a first end portion of the U-shaped cantilever member is pushed towards to a second end portion of the U-shaped cantilever member for placing the plastic lock mechanism in the released position.

5. The plastic arrangement according to claim 1, wherein in the locked position, the catch element retention part blocks a plastic component unfastening movement of the catch element in a first direction, and
wherein the protruding member retainer part restricts a protruding member unfastening movement of the protruding member in a second direction.

6. The plastic arrangement according to claim 5, wherein the second direction is perpendicular to the first direction.

7. The plastic arrangement according to claim 3, wherein the protruding member is positioned between the catch element and the first end portion of the U-shaped cantilever member.

8. The plastic arrangement according to claim 1, wherein the protruding member retention part comprises a pair of retention arms, the retention arms and the disc element provide a socket and ball connection mechanism.

9. The plastic arrangement according to claim 1 further comprising a deflection limiter part for restricting the movement of the U-shaped cantilever member.

10. The plastic arrangement according to claim 1 further comprising a plastic living hinge for connecting the first plastic component to the second plastic component.

11. The plastic arrangement according to claim 1, wherein the first plastic component, the second plastic component, and the plastic lock mechanism are produced by plastic injection moulding.

12. A plastic housing for storing an electronic component, the plastic housing comprising:
the plastic arrangement according to claim 1 comprising:
the first plastic component configured as a plastic first housing portion,
the second plastic component configured as a plastic second housing portion, and
the plastic lock mechanism for fastening the plastic second housing portion to the plastic first housing portion.

13. The plastic arrangement according to claim 4, wherein the protruding member is positioned between the catch element and the first end portion of the U-shaped cantilever member.

* * * * *